Figure 5:
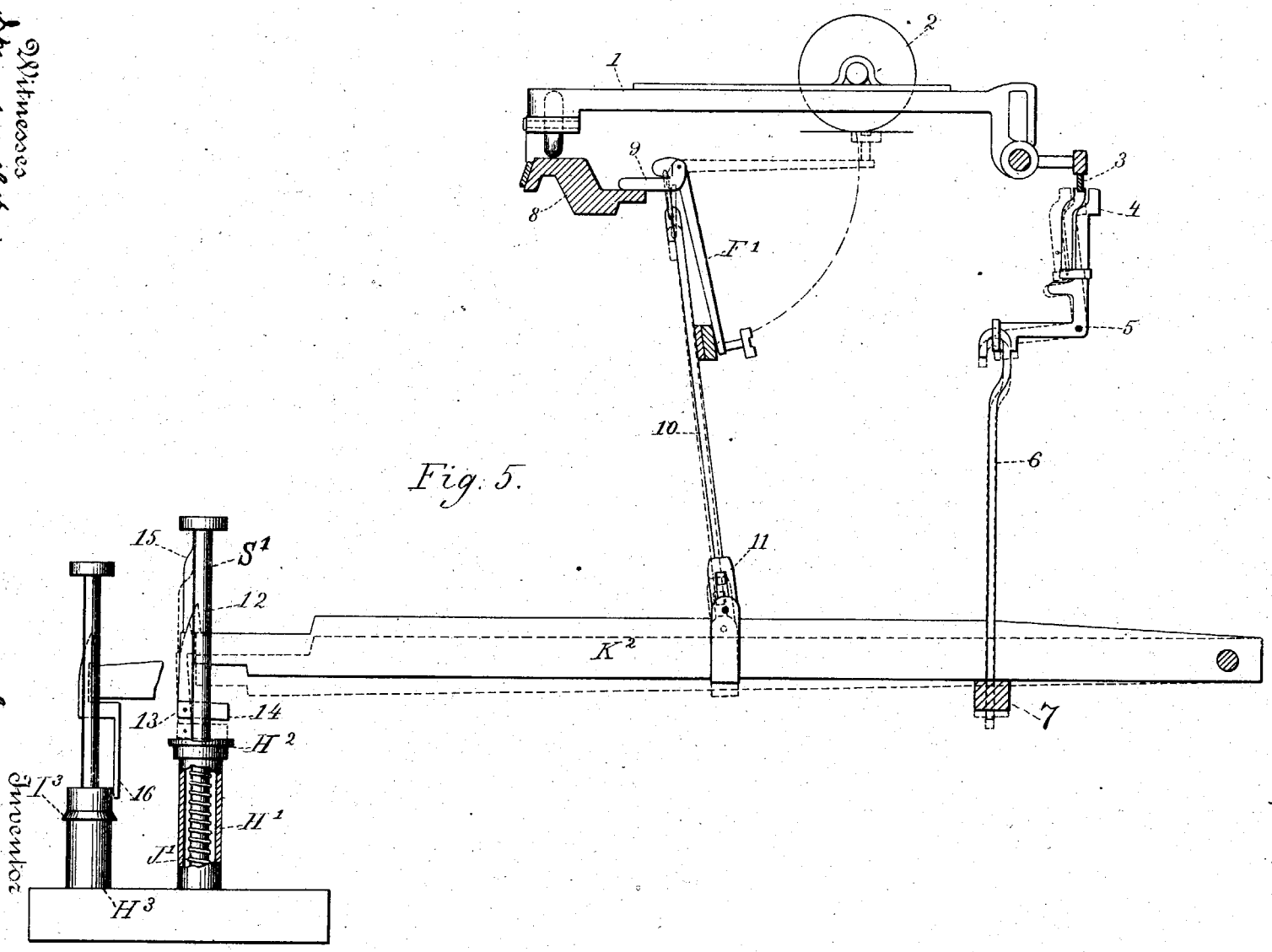

2 Sheets—Sheet 1.
G. K. FLOWER.
TYPE WRITING MACHINE.
No. 11,391. Reissued Nov. 28, 1893.
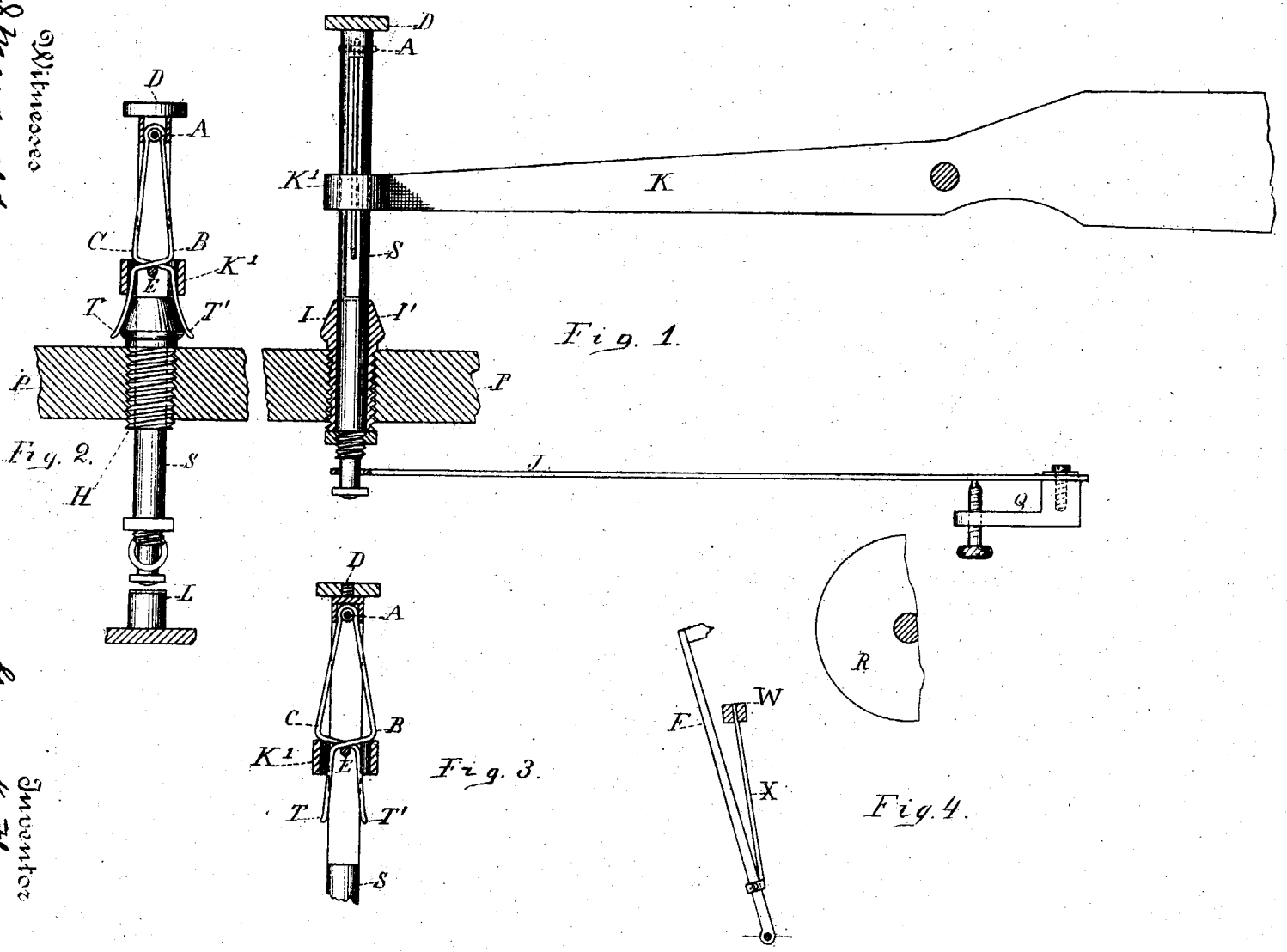
Witnesses
J. Macdonald
Edwin C. Dusenbury
Inventor
George K. Flower
By his Attorney
Jacob Felbel 2 Sheets—Sheet 2.

G. K. FLOWER.

TYPE WRITING MACHINE.

No. 11,391. Reissued Nov. 28, 1893.

Witnesses
J. Macdonald
Edwin C. Disenbury

By his Attorney

Inventor
George K. Flower
Jacob Felbel

UNITED STATES PATENT OFFICE.

GEORGE K. FLOWER, OF PITTSBURG, PENNSYLVANIA, ASSIGNOR, BY MESNE ASSIGNMENTS, TO JOSEPH S. AUERBACH, OF NEW YORK, N. Y.

TYPE-WRITING MACHINE.

SPECIFICATION forming part of Reissued Letters Patent No. 11,391, dated November 28, 1893.

Original No. 426,931, dated April 29, 1890. Application for reissue filed June 27, 1893. Serial No. 478,996.

*To all whom it may concern:*

Be it known that I, GEORGE K. FLOWER, a citizen of the United States, residing in Pittsburg, in the county of Allegheny and State of Pennsylvania, have invented certain new and useful Improvements in Type-Writing Machines, of which the following is a full and exact description, reference being made to the accompanying drawings, in which—

Figure 1 is a vertical side elevation, partly in section, showing one form of my trip or release device, and applied at the lever of a type-writing machine, and showing the lever and key in their normal or initial positions. Fig. 2 is a front elevation of the same, showing the key and key-lever depressed and the spring contracted within the collar. Fig. 3 is a front elevation of the same, showing the spring expanded above the collar. Fig. 4 is a side elevation of a type-bar of a type-writing machine, with my spring and weight attachment, a portion of the platen being also shown; and Fig. 5 is a view showing my invention carried out in other forms in a Remington type-writing machine.

Hitherto the operation of type-writing has been performed by pressing the fingers directly on the ends of the levers that actuate the other operative parts of the machine, the operator withdrawing each finger from each key in succession, in order that there should be no conflict between any two keys or their relative operative parts.

The object of my invention is to provide a machine, having a series of type-bars printing at a common point, which may be operated and printing performed, and in which the type-bars and the mechanisms connected therewith, by which the printing may be performed, are enabled to resume their initial positions independently of the keys, whereby after the depression of one key a succeeding key or keys may be operated, without releasing or relieving from pressure any key previously operated. By the employment of a trip device, the operator is enabled to write or print more rapidly and with greater ease and accuracy than heretofore, for not only is the liability of the locking or interfering of the operative parts of the machine greatly lessened by the use of such a device, but the natural alternative action of the fingers is facilitated, and the unavoidable pause of each finger at the time of the impression of the type on the paper does not impede or detain the other fingers.

In the type-writing machine not only does the key-lever actuate the type-hammer, but it also puts into action those parts of the machine that must act when the impression of a character is made and come to rest before another character can be printed—as for instance the paper-carrier and ink-ribbon—and any device that releases these parts more quickly than heretofore of course enables them to assume their new positions more expeditiously.

My improved device, in addition to affecting the type-bar, therefore also affects those operative parts, some of which are of considerable weight and require all the time that can be obtained for their movement between the impressions of the type-characters.

Accordingly my invention consists in the combination, in a machine in which the type-bars print at a common point, and in which the keys and levers are operatively connected to the type-bars and to the paper-carrier-feeding mechanism, of a key, a lever and a releasing device, so arranged that upon depression of the key the type-bar will print and return to its initial position, and the paper-carrier will move to a new printing position, both independently of releasing or relieving the key from pressure, whereby succeeding keys may be operated progressively without regard to the releasement of any key.

My invention also consists of a key connected to a key-lever and so constructed that when the key is depressed by the finger it will impel the key-lever to a certain point, where it shall be released from the key, and the said key-lever, being impelled by a spring or other motive power, is thus permitted to return quickly to its initial position, during the return movement of its connected type-bar, independent and in advance of the return movement of the key, and consequently independent of the removal or relieving from pressure of the finger that operates the key.

My invention further consists in certain details of construction and combinations of parts, all of which will be hereinafter more fully described and particularly pointed out in the appended claims.

Referring now to Figs. 1, 2, 3 and 4, the releasing device, attached directly to the finger-key, and made in the form of a spring A B C, is so applied as to act directly upon the key-lever, which in turn operates all the operative parts of the machine. This arrangement constitutes a less complicated one than where each of these parts may be made to disconnect with the key-lever, and the device may be applied to all or nearly all of the type-writing machines now made or in use, without requiring any material change in their special designs or operative parts.

I will now more fully describe my invention in connection with the figures of drawings referred to.

K is the lever of a type-writing machine, the outer end of which is shown terminating in a collar K′. The stem S of the key passes loosely through this collar, the cap D at the upper end of the stem serving for a bearing for the finger of the operator. The stem S of the key also passes downwardly through and is adapted to operate within the cylinder H, which is screwed into the plate which forms part of the frame of the machine. Said stem is provided with a slot extending from a point near its upper end to a point below the collar mentioned, in which slot is secured the double spring A B C, having projecting tips T T′. The outer surface of the cylinder H above the plate P is sloped outwardly and downwardly, forming an inclined plane or a tripper I I′, on which the ends of the double spring may slide. The lower end of the stem rests upon the spring J, firmly affixed to the frame of the machine at Q. Below the stem and suitably attached to the frame of the machine is the cushioned stop L, which may be adjusted to be touched by the stem of the key at the moment of the release of the lever from the spring A B C.

F is a type-bar pivoted at its lower end, with a spring X, to which is secured at the outer end a weight W, the momentum of which, when the said bar is impelled against the ribbon, pad or paper, presses the type firmly against the ribbon, pad or paper, for an almost unappreciable portion of time, but sufficiently long in duration to make a clear and distinct impression thereon, the rebound of the spring throwing the weight against the type-bar, increasing its velocity to its initial position.

The operation of the construction shown at Figs. 1, 2, 3 and 4 is as follows: The finger of the operator, depressing the stem S, causes the shoulder of the spring to press or impinge against the upper edge of the collar and bear down the end of the lever until the lower outwardly projecting ends or tips of the double spring impinge against the inclined planes of the cylinder or tripper H. This contracts the shoulders of the spring at B C within the slot, and the end of the lever, being released from the downward pressure, returns by its own recoil (caused by the overbalancing weight of the inner end of the lever K, or by its own resiliency) to its initial position. At the same time the type-bar connected thereto returns to its initial position. Either immediately thereafter or after the operation of other keys the stem may be permitted to rise, the finger being removed from the cap, and the recoil of the spring at the base of the stem-key forcing it upward, the double spring in the stem-key again contracting as it is forced through the collar, and again expanding when the shoulders are above the edge of the same.

E is a pin attached to the stem at the junction of the downwardly projecting tips of the spring A B C, to prevent undue expansion of the spring at its shoulders, when the said shoulders are permitted to rise above the collar.

Referring now to Fig. 5, 1 represents the paper-carrier of a Remington type-writing machine, which is provided with a platen 2 and a feed-rack 3. 4 are the letter-spacing dogs, mounted upon a pivoted rocker 5, which is connected at each end by a rod 6 to a universal bar 7, which underlies all of the key-levers $K^2$. 8 represents the top plate or type-ring of the machine, upon which by hangers 9 the type-bars F′ are preferably pivoted. Each type-bar is connected to a key-lever $K^2$ by a connecting-rod 10 and turn-buckle 11. The forward end of each key-lever is normally engaged by the hooked end 12 of an L-shaped trip piece pivoted at 13 upon a key-stem S′, which is adapted to slide in a tube or housing H′, having a perforated cap $H^2$ at its upper end. The said stem S′ is provided with a spring J′ for returning same.

In the operation of the construction shown at Fig. 5, when the stem-key is pushed down by the finger of the operator, the key-lever is depressed, the type-bar lifted to print, and the carrier-feeding mechanism actuated to effect spacing between letters. When the inner projecting end 14 of the L-shaped trip piece strikes against the top of the cap $H^2$, the trip piece is vibrated about its pivot, and the hooked end 12 is thrown outwardly, thereby releasing the key-lever and its connected mechanisms and permitting them to return at once to their normal positions. When the finger-key is relieved of pressure the spring J′ causes it to ascend, and the hooked end of the trip piece re-engages with the key-lever at the completion of the upward movement of the key-stem, the said piece being provided with a slender spring 15 to return it to its normal position as the stem-key ascends, and to cause the hook-shaped end to snap upon or re-engage with the end of the key-lever upon the return movement of the stem-key.

At Fig. 5 I have shown at the front key a modified construction involving my invention, the key-lever being broken away. In this instance the pivoted trip piece is provided with a downward projection 16, which on depression of the key contacts with a beveled surface $I^3$ on the tube $H^3$, which throws the hooked end off of the end of the key-lever, thereby enabling the latter and its connected parts to resume their normal positions independently and in advance of the return of the finger-key.

I do not make any specific claim in this case for either form of trip, *per se*, shown at Fig. 5.

Having now sufficiently described my invention, what I desire to secure by Letters Patent is as follows:

1. In a type-writing machine, the combination of a paper-carrier, means for feeding the same, a type-bar, a key-lever operatively connected to the type-bar and the carrier-feeding mechanism, and adapted when depressed to actuate the same, a finger-key, and a tripping means adapted to simultaneously release the type-bar and the carrier-feeding mechanism, to enable the same to resume their normal positions independently and in advance of the finger-key, whereby a succeeding key or keys may be operated and the carrier fed at each operation, without releasing or relieving from pressure any key previously operated.

2. In a type-writing machine, the combination of a key and a lever actuated thereby and adapted to operate a type-bar, and a means whereby said key-lever and type-bar are enabled to resume their initial positions simultaneously independently of the key, whereby a succeeding key or keys may be operated without releasing or relieving from pressure any key previously operated, as and for the purpose set forth.

3. In a type-writing machine, the combination of a key, a stem, a flexible spring attached thereto, a key-lever, and a tripper, whereby when the said key is depressed the spring impinges upon and operates the key-lever and immediately thereafter is actuated by the tripper to release the key-lever and permit it to return to its initial position in advance of the return of the key, substantially as and for the purpose set forth.

4. In a type-writing machine, the combination of a key, a flexible spring attached thereto, a key-lever, and a tripper, whereby when the key is depressed the spring impinges upon and operates the key-lever and immediately thereafter is actuated by the tripper to release the key-lever and permit it to return to its initial position in advance of the return of the key, and a spring attached to the type-bar and provided with a weight at one end, substantially as and for the purpose set forth.

GEORGE K. FLOWER.

Witnesses:
JNO. H. RONEY,
JAS. J. MCAFEE.